(12) United States Patent
Mayer et al.

(10) Patent No.: US 7,872,647 B2
(45) Date of Patent: Jan. 18, 2011

(54) SYSTEM AND METHOD FOR MODELING A SPHEROID WORLD DATABASE

(75) Inventors: Neal L. Mayer, Salt Lake City, UT (US); Michael A. Cosman, South Jordan, UT (US); Robert C. Dawson, Salt Lake City, UT (US); Heber B. Bennion, Salt Lake City, UT (US)

(73) Assignee: Rockwell Collins Simulation and Training Solutions LLC, Cedar Rapids, IA (US)

( * ) Notice: Subject to any disclaimer, the term of this patent is extended or adjusted under 35 U.S.C. 154(b) by 1544 days.

(21) Appl. No.: 10/622,885

(22) Filed: Jul. 18, 2003

(65) Prior Publication Data
US 2004/0098236 A1 May 20, 2004

Related U.S. Application Data (60) Provisional application No. 60/397,470, filed on Jul. 19, 2002.

(51) Int. Cl.
*G06T 17/00* (2006.01)
(52) U.S. Cl. ...................................................... 345/420
(58) Field of Classification Search .................. 345/645
See application file for complete search history.

(56) References Cited

U.S. PATENT DOCUMENTS 6,023,654 A * 2/2000 Mohlenkamp ............... 701/208

OTHER PUBLICATIONS

El-Hakim, S., Brenner, C., Roth, G., A multi-sensor approach to creating accurate virtual environments, Jul. 1998, ISPRS Journal of Photogrammetry & Remote Sensing, pp. 379-391.*

Lindstrom, P., Koller, D., Ribarsky, W., Hodges, L., Op den Bosch, A., Faust, N., An Integrated Global GIS and Visual Simulation System, Mar. 1997, Georgia Institue of Technology, pp. 1-9.*

Reddy, M., Iverson, L., Leclerc, Y., Under the Hood of GeoVRML 1.0, Feb. 2000, Proceedings of the fifth symposium on Virtual reality modeling language (Web3D-VRML), pp. 23-29.*

GE Aerospace, Compu-Scene VI, Performance From Tomorrow, Nov. 1990.

R. L. Ferguson, General Electric Company, An Integrated Approach to Data Base Generation for Visual Simulation, Nov. 1990.

R. L. Ferguson, GE Aerospace, High Fidelity, Low Cost Data Bases for Visual Simulation, May 1991.

* cited by examiner

*Primary Examiner*—Ulka Chauhan
*Assistant Examiner*—Said Broome
(74) *Attorney, Agent, or Firm*—Thorpe North & Western LLP (57) ABSTRACT

A system and method is provided for modeling a world database that is a spheroid in a computer graphics simulation system. The method includes the operation of modeling the world database using a plurality of geodetic terrain gridposts. A further operation is creating a triangulated network mesh based on the geodetic terrain gridposts in real-time as a function of eye position. In addition, the triangulated network mesh is stored in geodetic coordinates. The triangulated network mesh is then rendered using geometry formed by the triangulated network mesh.

7 Claims, 8 Drawing Sheets

SYSTEM AND METHOD FOR MODELING A SPHEROID WORLD DATABASE

This application claims priority from U.S. Provisional Patent Application No. 60/397,470.

FIELD OF THE INVENTION

The present invention relates generally to a system and method for modeling a world database that is a spheroid in a computer graphics simulation system.

BACKGROUND

Map projections have been used to convert geographic database source information into a rectangular coordinate system to build a run-time visual environment database that can be processed and displayed by a computer image generator. The methods used in these projections have developed over the years to accommodate and correct for most (but not all) of the distortions introduced by the map projection. In the end, the conversion method is complex and there are still potentially observable problems in geodetic databases because of these distortions. There has always been a need and a desire to create a coordinate system and a technique for creating and rendering the databases that would correlate precisely to the real world over any area of the world. Unfortunately, the precise correlation has been difficult to provide because of the incongruities between spherical and rectangular coordinate systems. Further, rectangular coordinates are needed by image generators, and so complex conversions have been used between spherical and rectangular coordinates.

At least two different coordinate systems will be used in this description to describe the position of an object on or near the earth. Two of these coordinate systems are the geodetic and topocentric systems. Each of these coordinate systems will be described below.

Figure 1:
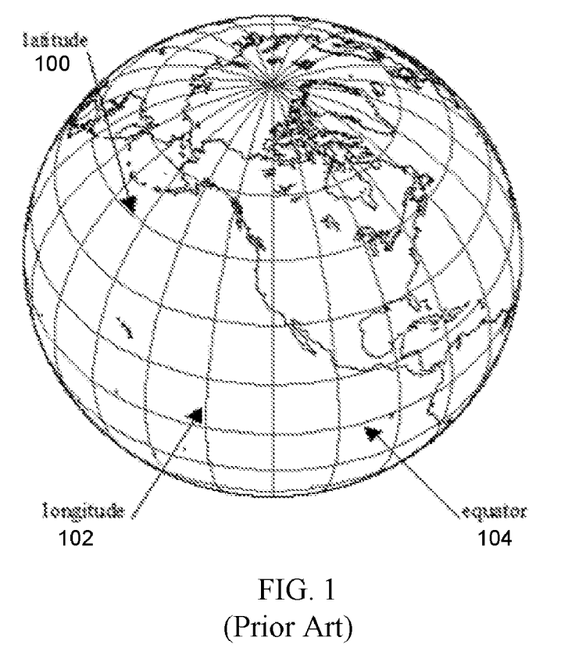
FIG. 1 is a perspective view illustrating the latitude, longitude and equator of the earth.
Figure 2:
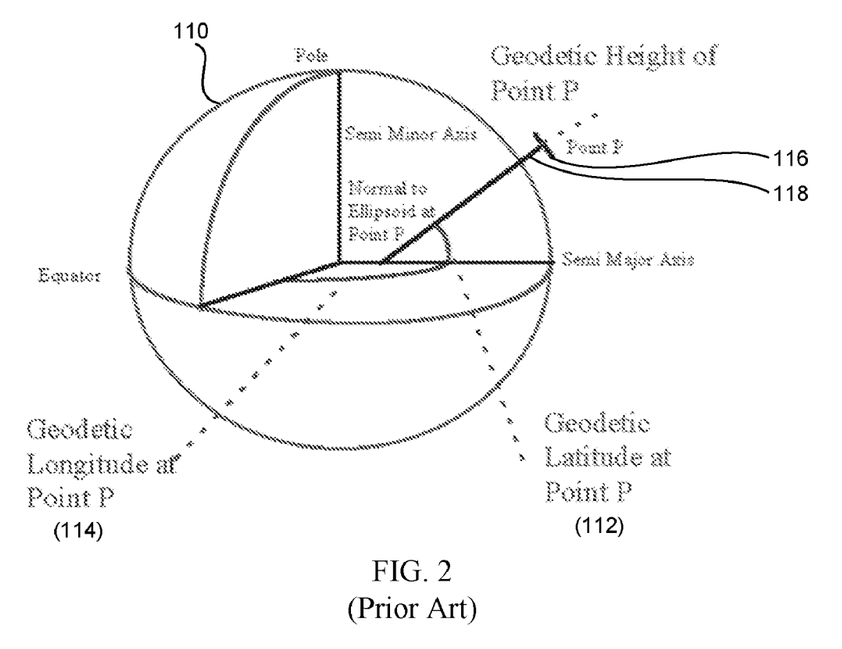
FIG. 2 is a cross-sectional view of the earth's ellipsoid as in FIG. 1 which illustrates a point P with a geodetic latitude ($\phi$), a geodetic longitude ($\lambda$), and an altitude (h)

Geodetic Coordinates are typically used when describing the position of an object on the surface of the earth or an object in the air that is not too far from the surface. FIG. 1 illustrates latitude 100, longitude 102 and the equator 104 on the earth. The geodetic coordinate system uses the references of latitude ($\phi$), longitude ($\lambda$), and altitude (h). This system of geodetic coordinates is well known and commonly used for navigational purposes. In addition, FIG. 2 illustrates an ellipsoid 110 that represents the earth and for a given point P As discussed, the problem with geodetic coordinates in an image generator database is that geodetic coordinates are spherical in nature and the image generator needs to work with rectangular or Cartesian coordinates. The geographic source material that is typically used to generate a database comes in geodetic coordinates, but the actual primitives manipulated by the image generator are in rectangular coordinates using (x, y, z). Consequently, there is the need for some type of a transformation from geodetic to rectangular coordinates. In the context of the present discussion, it is valuable to describe topocentric coordinates that are eyepoint centered. The origin of topocentric coordinates is at the current latitude and longitude of the eyepoint with the altitude set to 0 at mean sea-level. If the eyepoint is at a current position of ($\phi_o$, $\lambda_o$, $ho_o$), then the origin of the topocentric coordinate system is ($\phi_o$, $\lambda_o$, 0).

Figure 3:
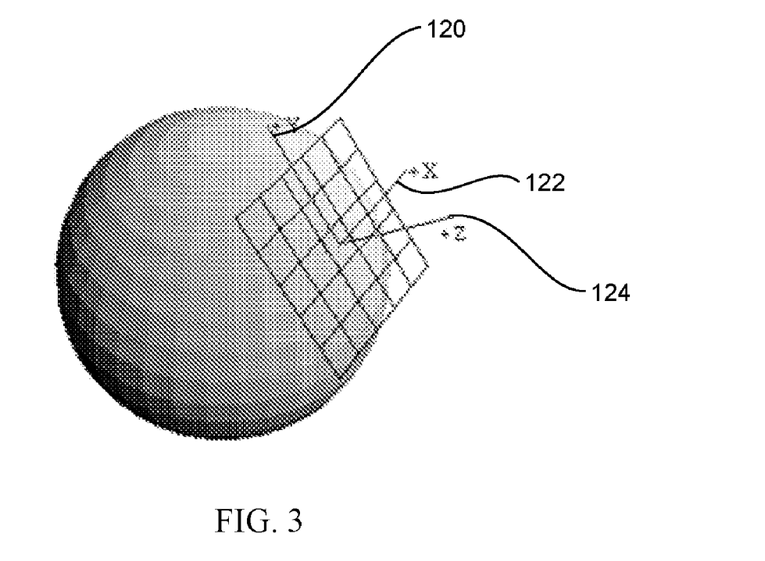
FIG. 3 illustrates a distant perspective on a topocentric coordinate system with X, Y and Z coordinate axes.
Figure 4:
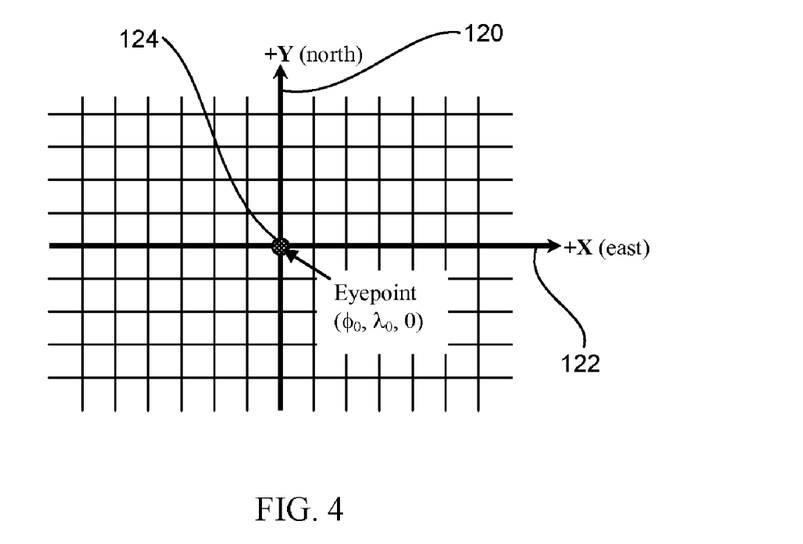
FIG. 4 is a closer view of a topocentric coordinate system.

FIG. 3 illustrates a distant perspective on the topocentric coordinate system where the coordinate axes are oriented so that the +Y axis points true north 120, the +X axis points due east 122, and the +Z axis is oriented straight up 124. The XY plane of the coordinate system is defined to be tangent to the earth model ellipsoid at the eyepoint with the +Z axis being normal to the XY plane at the origin. FIG. 4 is a closer view of a topocentric coordinate system.

Using topocentric coordinates along with a projection process is roughly equivalent to placing a flat plane (representing the needed database area) tangent to the surface of the earth with the plane's center touching the earth. Then the terrain and features are projected from the earth onto this plane. As the plane size is increased, the distortion at the plane's edges will increase. Thus, for databases larger than several hundred miles radius, several tangent planes can be used with their own projection spaces to reduce the distortion. Then the simulation system must manage the problem of crossing from one plane to the other at run time. This involves solving the geometric mismatch of the terrain and features across these boundaries, and hiding cracks caused by the lack of strict vertex sharing.

In other cases, where a very long (but not very wide) geographic database is required, a tangent cylinder can be used. In each case, the transforms that preserve directions and scales are defined as accurately as possible. Usually, this involves a continuous distortion of positional information supplied by a host program in order to derive the position and orientation of the instantaneous eyepoint in the tangent plane or cylinder.

The visual manifestation of increasing distortions on the plane is that simulated objects do not appear to be the correct distance apart. For example, if the simulation is a flight simulator, then the distortions will affect the laser range finders; or in certain directions the distortion will affect the sensors and magnified channel targeting functions. In extreme cases, scale distortions begin to cause a perceptible difference between indicated and observed velocity of the eyepoint or vehicle.

The source material used to construct the visual environment databases typically includes a terrain elevation grid that is regular and orthogonal in latitude/longitude (lat/long). For example, DMA DTED (Defense Mapping Agency—Digital Terrain Elevation Data), and other vector feature data, such as DMA DFAD (Defense Mapping Agency—Digital Feature Analysis Data) can be used which are also in lat/long coordinates. Various database library models of individual scene features, such as buildings and landmarks, are constructed and stored in the database in Cartesian coordinates.

All of the data that starts in lat/long is typically re-sampled into the chosen Cartesian system. In other words, the geographic data is projected from the spherical earth onto the chosen tangent plane. This operation is unique and specific to the particular choice of a tangent plane, so the resulting data is useful only for a particular customer and project using this plane. Any subsequent operations on the data, including error correction, updating, and enhancements are specific to a given customer and cannot easily be used in generic situations. Any image data or textures that are applied to the terrain must be re-sampled with this projection and become project-specific. Since these transformations are done early in the compilation of the database, the volume of data is large and the computation takes a significant amount of CPU time.

The existence of projections has many ripple effects and ultimately influences other parts of the simulation environment. For example, customers may want to be able to correlate the database with paper maps and charts. In order to make this work properly, the creator of the database generally ends up creating these charts from the final database, so that the transforms and projections applied in making the database are properly accounted for. Thus, distances measured directly on the charts correspond to distances in the tangent plane, etc.

Another side effect of the projections affects the modeling tools. Modelers have an ongoing need to create and revise features, buildings, and landmarks whose position is derived from lat/long sources. This means that customer-specific projections have to be supported or at least accounted for in some of the modeling tools, including some interactive, visual editors. All of these project specific modifications create a tremendous amount of work to create just one run-time visual environment database.

SUMMARY OF THE INVENTION

The invention provides a system and method for modeling a world database that is a spheroid in a computer graphics simulation system. The method includes the operation of modeling the world database using a plurality of geodetic terrain gridposts. A further operation is creating a triangulated network mesh based on the geodetic terrain gridposts in real-time as a function of eye position. In addition, the triangulated network mesh is stored in geodetic coordinates. The triangulated network mesh is then rendered using geometry formed by the triangulated network mesh.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The system and methods of the present invention allow a database to be created and rendered that correlates relatively closely to real-world coordinates at locations within +80° latitude. This system and method continues to work at higher latitudes with increasing errors, and use at or near the pole is better avoided. The use of the coordinate system of the invention requires significant changes as compared to prior database creation methods and real-time rendering algorithms, but the changes result in scenes that correlate more precisely to the real world, and help satisfy customers' demand for a "whole round-earth". In other words, the present invention enables the database to represent the entire earth and not just selected portions of the earth.

A whole-earth geodetically correlated visual environment database can be modeled in geodetic coordinates and continuously transformed at run time into an eye-centric local Cartesian space for processing by standard rendering hardware. One underlying idea of the database coordinate system of the present invention is that individual models are constructed using the known methods for a rectangular coordinate system in (x, y, z), but everything else in the database is constructed in geodetic ($\phi$, $\lambda$, h) coordinates. Global texture, height fields, and themel fields are also stored in geodetic coordinates.

The present system and method is a significant departure from how databases have been constructed in the past. Historically, a project-specific map projection was chosen that minimized errors and distortion over the geographic area of interest. Then, all terrain, terrain elevation, feature, feature placement, and texture data was transformed into this project-specific Cartesian coordinate system. Ultimately, the progressively refined, enhanced and corrected source data ended up in a non-portable and non-reusable customer-specific form. In addition, the single map projection was of limited extent because any chosen map projection is only generally accurate over a fairly small geographic area.

Figure 5:
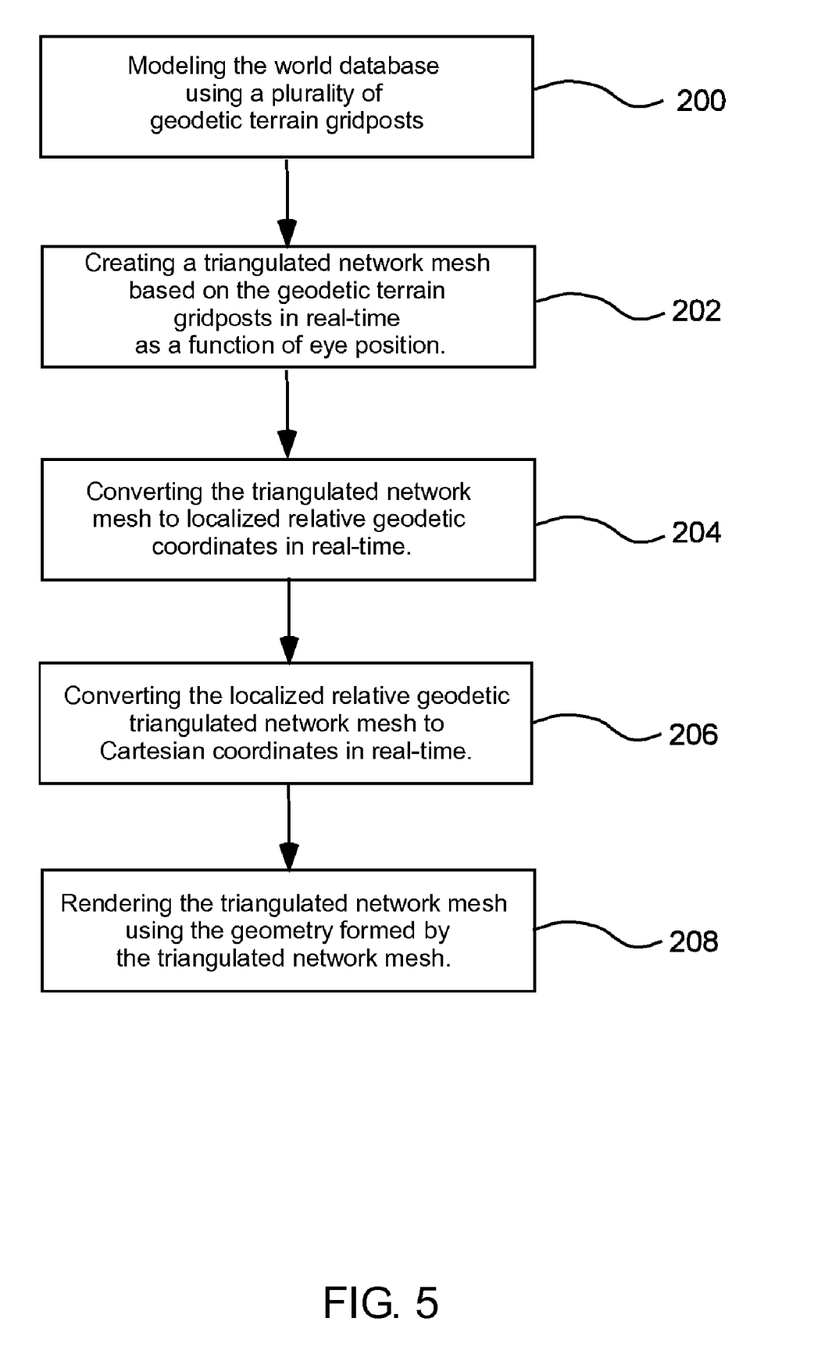
FIG. 5 is a flow chart illustrating an embodiment of a method for modeling a world database that is a spheroid.

FIG. 5 is a flow chart illustrating an embodiment of a method for modeling a world database that is a spheroid in a computer graphics simulation system. The method can include the operation of modeling the world database using a plurality of geodetic terrain gridposts 200. A triangulated network mesh can be created based on the geodetic terrain gridposts in real-time 202. The mesh can be a function of eye position and the triangulated network mesh is stored in geodetic coordinates. Another operation is converting the triangulated network mesh to localized relative geodetic coordinates in real-time 204. The localized relative geodetic triangulated network mesh can then be converted to Cartesian coordinates in real-time 206. A further operation is rendering the triangulated network mesh using the geometry formed by the triangulated network mesh 208. The rendering can apply lighting, shading, and texture to the triangulated network. After rendering, the triangulated network can be displayed to a user.

The terrain database can be a single continuous triangular mesh that covers the whole earth. However, the earth is all modeled relative to a flat datum defined by the lat/long coordinate system. Terrain facet vertices in this system have lat/long coordinates, not X/Y coordinates and the "up" or Z coordinate is altitude. This terrain model wraps entirely around the earth in longitude as a seamless, continuous skin. More specifically, the terrain vertices at 180° longitude are coincident with matching terrain vertices at +180°. This defined database is "flat", not curved around a spherical model. Z is always "up", X and longitude are always aligned, and Y and latitude are always aligned. While one embodiment of this invention uses on-the-fly construction of the terrain facets from a lat/long gridded elevation matrix, a compiled model can be used to provide a whole-earth solution.

During real-time operation, the database graph is traversed and the offsets that are in geodetic coordinates are accumulated. When the graph gets to a node that is a model, for example a house, tree, airport, etc. then the current geodetic coordinates that have accumulated so far for that node are transformed into topocentric coordinates and then graph traversal continues in topocentric coordinate mode. Thus, all polygons that are output to the geometric processors are in topocentric coordinates, which is a Cartesian coordinate system the image generator can use. In addition, real-time is generally defined here as the generation of visual simulation output at a rate that matches a user's live input, as opposed to compile -time or offline visual output.

In this local space, the horizontal datum or local mapping surface is tangent to the earth's surface, the X axis always points east, the Y axis always points north, and the Z axis always points "up". The scaling of the axes is some familiar common unit like feet or meters, and the Z values are relative to mean sea level (MSL). The present invention solves a longstanding problem involving the creation and display of wide-area databases, and the historic difficulties dealing with map transforms and geodetic source materials.

The present system carries a tangent plane around with the eyepoint (in effect), which becomes the instantaneous contact point with the spherical earth. For each image frame, the system re-projects the spherical world onto this tangent plane before rendering it into pixels for a user to view. As a result, the local scene is distorted very little because the tangent plane is close to the surface of the earth, near the eyepoint. The system stores the database in a form that is independent of the eyepoint location and in a form that is easily transformed onto the moving tangent plane at run time.

One embodiment of the invention supports whole-earth databases that are stored in geodetic coordinate form. Further, since the present invention aligns the Cartesian axes (X/Y) with east/north, geodetic latitude/longitude coordinates can be used as the stored database form.

The general transformation from the sphere's surface to a point on a tangent plane is relatively complex, and both the X and Y axes depend on both the latitude and longitude distances of a vertex from the tangent plane's origin (relative to a transformation "origin"). This is because meridians converge, and parallels curve, as projected onto the tangent plane. Thus, parallel roads both heading due north exhibit a slight convergence that matches the meridian behavior. This convergence (and the corresponding curvature of parallels) becomes more pronounced as the eyepoint approaches the poles. However, the world becomes relatively uninteresting at latitudes long before the poles.

At latitudes of interest, meridian convergence and parallel curvature is very slight over the visibility ranges typical of flight simulators. So, instead of solving the general problem robustly using a complex transform, a simplified transformation can be employed in which parallels and meridians transform into straight lines that meet orthogonally. In other words, parallels align with the X axis, and meridians align with the Y axis. In such a transform, latitude scales directly into the Y coordinate, and a latitude-specific scale factor transforms differential longitudes into differential X coordinates. This scale factor is computed for a latitude at or near the eye position and changes at run time as the eye moves.

The global texture, height fields, and themel fields, if included in the image generator architecture and database design, are stored in geodetic coordinates but the (u, v) coordinates that are used to index into these fields are scaled each frame in such a way that the conversion from geodetic to topocentric takes place.

This method and system can provide the following:
Feature models (static and dynamic) are modeled and stored in regular Cartesian coordinates.
Feature models are positioned in the database in geodetic coordinates.
Global texture is stored in geodetic coordinates.
Height fields and themel fields are stored in geodetic coordinates.
The database graph is structured using geodetic coordinates but Cartesian coordinates are used for the models.
Coordinate transformations can take place during graph traversal and rendering.

One beneficial result of the features listed above is that the positional correlation of the simulation with the real-world is nearly exact. Another result is the avoidance of custom map transforms and detailed database modeling which have been used to minimize transformation distortions for large area databases. In addition, the present invention finally makes it possible to create a single whole-earth database where continuous flight or travel from one place to any other place can be simulated without visual interruptions.

A generic whole-earth database can form the starting point for each customer's particular simulation requirements and then embellishments can be provided to the areas of the customer's particular interest. The use of a single whole-earth database also offers a system developer cumulative rewards or benefits for assembling and improving a single global representation of the earth. This is in contrast to the database improvements that are lost when improvements are made for one customer's proprietary database simulation.

Another result of using a whole-earth database with an underlying geodetic format is that most available geo-referenced data is maintained in lat/long coordinates. Thus, the stored database coordinates remain quite close to the original source format. This makes the whole-earth database easier to enhance and update. Further, any changes that are made to the database can be made locally because they do not require recompilation of the entire database.

Another valuable element of the present invention is that the storage of the visual environment model is in geodetic coordinates, with an eyepoint dependent, run-time conversion of the local, visible database portion to a Cartesian form that is compatible with the algorithms used in the rendering hardware. This conversion employs a latitude-dependent scale applied to geodetic coordinates. In addition, other model data that is already in Cartesian coordinates can be included in a straight-forward manner with the visual environment model.

The present terrain model cannot be viewed in its entirety simultaneously. Particularly, this is because the lat/long/altitude coordinate system within which the terrain model exists has no visual meaning, and cannot be rendered by generally known graphics algorithms. There is no global transformation method that converts the entire model to Cartesian coordinates. However, portions of the terrain can be converted to Cartesian coordinates and these portions can be large enough to provide a visual scene extending several hundred miles from the observer, provided the converted portion is generally centered about the observer.

Since all scene geometry must eventually be output in an eye-relative Cartesian coordinate system for the rendering engine, this conversion begins early in the geometry process. The eye becomes a roving local coordinate origin that has a global lat/long position. For the eye position to be more useful as a global lat/long coordinate, the eye position is carried in double precision values. As mentioned previously, all the scene vertices in the lat/long system are converted to eye-relative lat/long by subtracting the eye lat/long position from them. At this point, the lat/long deltas can be converted to single precision value, which saves time, space, and processing power.

Next, these lat/long deltas are converted to X/Y deltas by scaling operations. The Y delta is the latitude delta times the conversion factor for degrees to feet or meters (depending on the Cartesian system units.) In the latitude direction, this factor is constant if a spherical earth model is used: 25,000miles=132,000,000 feet=360 degrees, so=1 degree=366,666 feet. If an ellipsoidal model is used (eccentricity is non-zero), then the Y conversion factor depends on the latitude of the eyepoint as described in the Mathematical Calculations section. The X conversion factor always depends on the latitude of the eye position. At the equator, the factor is identical to the Y factor. Away from the equator, the X factor is the equatorial factor times the cosine of the latitude.

The reverse transform, from X/Y to lat/long, is similarly straightforward. This allows the system, for example, to compute the kinematics of a model in X/Y, and then send its updated position back to the host system in global lat/long.

Because the scene is being constructed relative to the eye, progressive distortions in the distant scene are visually "attenuated" by increasing range. For this reason, the system may choose to ignore the subtle but complex arithmetic changes that account for the elliptical nature of the earth. The present invention does not necessarily provide earth's curvature for the transformed portion, but this can be easily done by depressing the Z coordinate of all vertices by a pre-determined factor multiplied by the square of their X/Y range from the eye position.

The terrain texture can be applied to the terrain vertices in their original lat/long form, or computed on-the-fly as part of a global texture system. In either case, the terrain texture is preferably in a fundamentally lat/long format, so that it wraps properly in longitude and is aligned with both the lat/long axes before conversion and the X/Y axes after the transformation to Cartesian.

The present system and method does have some difficulty at the poles, where the latitude scale factor goes to zero and all the X coordinates collapse to a single value. This may be solved by leaving a hole in the terrain skin, and covering the pole with a modeled "cap". This cap will preferably be large enough that the eye position cannot see a large amount of the perimeter from any one position. For example, the polar cap can be 500-2000 miles in diameter.

The foregoing discussion has provided an overview of the present invention and now a more detailed discussion of possible implementations and implementation components will be presented. The host is a system that oversees the operation of the simulator. The host monitors the crew's control inputs, and drives the cockpit dials, instruments and displays. In addition, the host controls the motion base, audio systems, and communicates with the visual system about drawing the out-the-window scene.

A real-time system is a software program within the visual system that controls the image generator in response to host inputs. The host tells the real-time system about object positions in the simulated environment (e.g., own aircraft, traffic aircraft, ground traffic, storms, etc.), the status of selectable items (e.g., runway and environmental lights, runway contamination, etc.), and position of global environmental effects like illumination (e.g., day, dusk, night) and visibility (e.g., fog, rain, etc.).

Typically, the host can send the positions for the eye-point and moving models in geodetic coordinates, (i.e., latitude, longitude, altitude, heading, pitch, roll) with the altitude in meters and everything else in degrees. The host does not need to know anything about the database origin because it is always at (0°, 0°, 0 m). The host does not do any map projection calculations and it just gives the positions of objects in geodetic coordinates.

In the present system and method, it is helpful if the database and the host use the same geodetic system. One possible geodetic system is WGS84 (World Geodetic System 1984), but if the customer or end user insists on some other system then consistency between the database and the host can make the system work properly.

There may be some simulators that want their host and database to be in a Cartesian coordinate system. For example, a driving simulator may not be configured to use geodetic coordinates. Then the host or real-time system can make the transformation of the (x, y, z) position computed for the driving simulation into (latitude, longitude, altitude) and then remaining interface will operate as discussed here.

Graph traversal is another part of the present system and method that is valuable. Most scene features are individual and isolated, and will continue to be modeled in Cartesian coordinates in the present invention. These features are generally placed (whether offset or instanced) in lat/long coordinates in the terrain. The accumulation of a chain of lat/long offset vectors is straightforward. However, the final placement and distribution of scene features with such a scheme is no longer invariant with latitude. For example, a forest of trees can be generated by creating instances of a few trees to make a grove, and a few groves to make a forest. The offset vectors of these objects can all be in lat/long and can be added together directly. However, the forest of trees will appear to compress in the longitude direction as the trees are moved away from the equator. Some features such as roads, railroads, power lines, and similar features are connected and need to be modeled entirely in lat/long. Their vertex coordinates can then be transformed at run time just like the terrain vertices.

Figure 6:
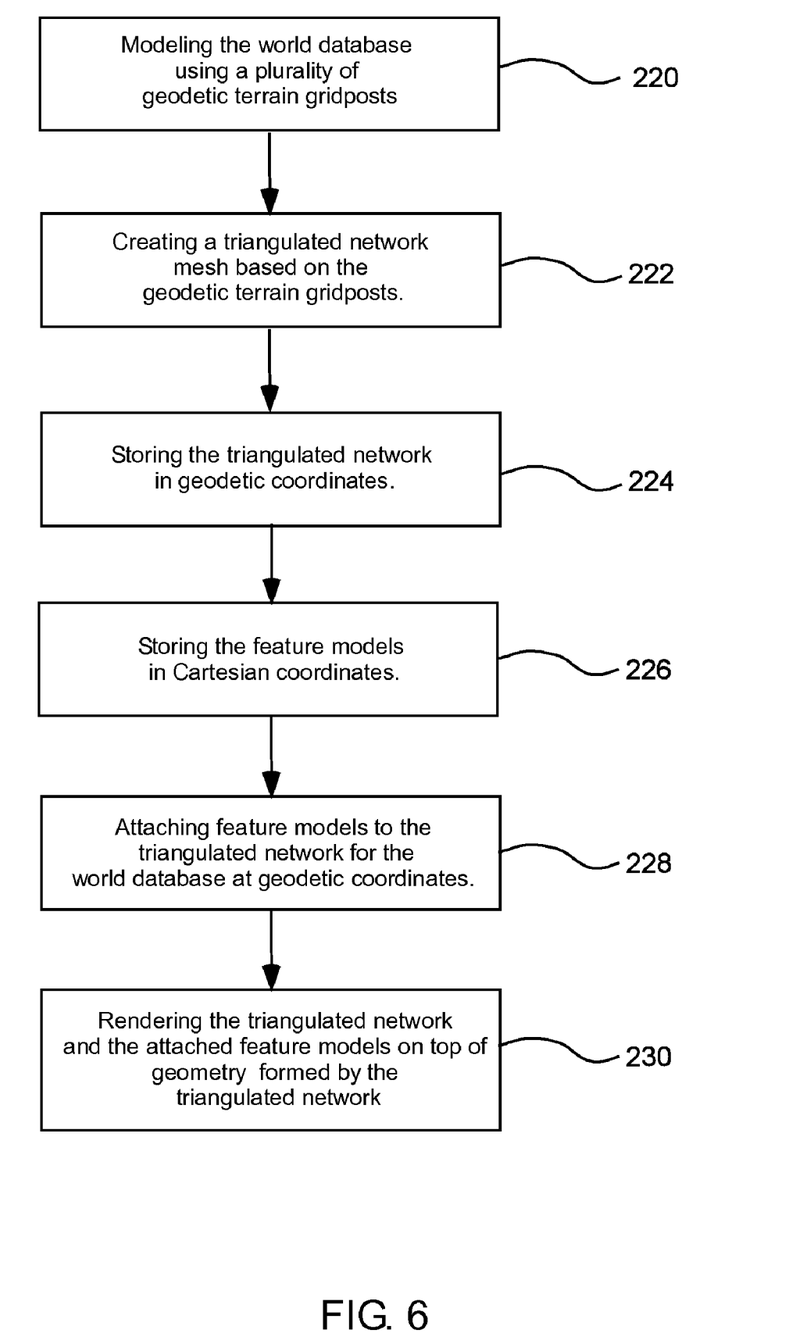
FIG. 6 is a flow chart illustrating an embodiment of modeling a world database using features models in Cartesian coordinates.

FIG. 6 is a flow chart illustrating an embodiment of modeling a geodetic world database using features models in Cartesian coordinates. The method of using Cartesian feature models includes the operations of modeling the world database using a plurality of geodetic terrain gridposts 220 and creating a triangulated network mesh based on the geodetic terrain gridposts 222. After the triangulated network is created, it can be stored in geodetic coordinates 224. The feature models are stored in Cartesian coordinates 226. Feature models are then attached to the triangulated network for the world database at geodetic coordinates 228. Finally, the triangulated network and the attached feature models on top of geometry formed by the triangulated network are converted and rendered for output and display 230.

In order to calculate the location of objects on the node tree, a system of accumulating the offsets for a given object is used. The structure of the feature database can be hierarchical with each node of the graph having an offset relative to its parent with the potential for scales and rotations as shown in the feature database graph of FIG. 7.

Figure 7:
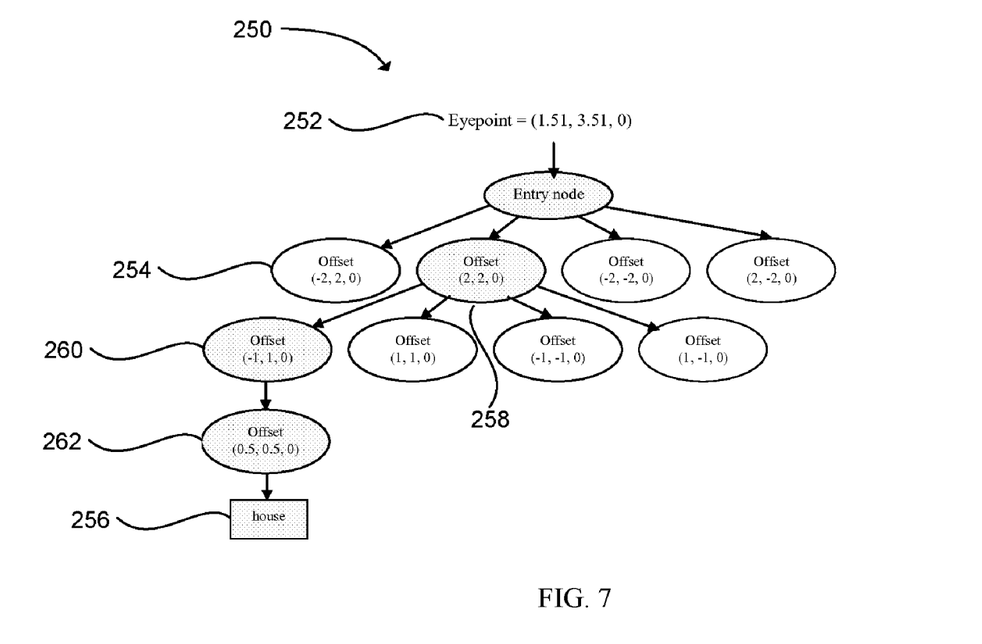
FIG. 7 illustrates an embodiment of a hierarchical feature database graph with each node of the graph having an offset relative to its parent.

As the graph walker traverses the tree 250, the graph walker constantly transforms the data into eye-centered coordinates 252. In the upper nodes of the tree 254, the offsets will all be in geodetic coordinates. When the graph walker encounters a node that is flagged as Cartesian, it will make the change from geodetic to Cartesian and continue walking the tree. At the leaf nodes 256, all of the polygons are output in Cartesian coordinates to the geometric processors.

For example, the offsets illustrated on the nodes in FIG. 7 are all in the center of the node and are in geodetic coordinates. As the graph walker moves down through the graph, the graph walker will take the path shown by the darkened nodes because the other nodes are beyond their level of detail (LOD) transition ranges. As the graph walker traverses the graph, the offsets are accumulated. The first offset 258 is (2, 2, 0) and adding the second offset 260 yields (1, 3, 0). Adding the third offset 262 yields (1.5, 3.5, 0). Then a square node 256 is encountered indicating that the geometry here is in Cartesian coordinates. Next, the graph walker can transform the current eyepoint-relative offset, (0.01, 0.01, 0.0), into topocentric coordinates using the equations given in the Mathematical Calculations Section. These calculations determine that the house is at an offset of (−1112.82, −1105.75, 0.0) relative to the eyepoint. Then the graph walker continues down as usual, working in eyepoint centered coordinates. This simple example graph illustrates the concept generally, but the data is more complex in its actual implementation form.

At each node there is the possibility of a rotation or a scale. The transformation matrices for these can be concatenated as is typically done. Because the matrix does not actually get applied until the final geometry is output to the geometric processor in topocentric coordinates, forming the scale and rotation matrix while working in geodetic coordinates does not present any serious problems. All of the components of the matrix are generated as they would be if the entire node tree or graph were in Cartesian coordinates.

In this graph walking process, all the model vertex information exists only in Cartesian coordinates and the geometric processor will work with those vertices as usual. However, the offsets in the nodes to get to those vertices are in geodetic coordinates. The transformation from geodetic to Cartesian takes place as low in the tree as reasonably possible and is eyepoint centered for each frame. The conversion from geodetic to topocentric loses accuracy with range from the eyepoint, and the system is more accurate when avoiding accumulating inaccurate offsets that have been converted for node centers that are far from the eyepoint.

Level of detail tests may also be included in the implementation of the present invention. As the graph walker traverses the database graph, it performs a range test at each level-of-detail node to determine which node to traverse. In most cases, the range test is a simple (x, y, z) range computation and comparison to the transition range. However, when the coordinates are geodetic the range test becomes a bit more complicated, and the equations for computing the range to the node are given in section A.3 of the Mathematical Calculations Section. The transition ranges for the nodes in the database can still be stored in meters. The equations given in section A.3 return meters for the comparison. At the leaf nodes of the database graph, topocentric coordinates are used. When the graph walker is in topocentric mode it can do the range computation using (x, y, z) methods.

For field-of-view culling, the clipping planes are typically rotated into eye-centered coordinates. Then at each node, a dot product between the eye-to-node vector and the clipping plane normal is performed. Before the dot product is computed the eye-to-node vector is transformed into topocentric coordinates. This is shown in section A.4 of the Mathematical Calculations Section. If the result is larger than the sphere radius, which is still represented in meters, and the sign is positive then the node is outside the clipping plane. The culling process may use other previously known culling algorithms without affecting the present invention. It makes the most sense for the clipping planes to be in the topocentric coordinate system but this is not required.

At the leaf nodes of the database graph, topocentric coordinates are used. When the graph walker is in topocentric mode, it can perform the culling computation using (x, y, z) methods.

By the time the geometric processor(s) receive any polygons for processing, the polygons are all in eyepoint centered Cartesian coordinates just as they have been in previous image generator systems. Therefore, this avoids changes in the geometric processing or rendering steps of the image generator.

Various embodiments of the database structures in the system and method of the present invention will now be discussed. The feature database is separate from the global texture and the height field databases, if they exist. The feature database has a hierarchical structure similar to previous image generator systems. As mentioned, one difference with this method is that the hierarchical structure is in geodetic coordinates.

Figure 8:
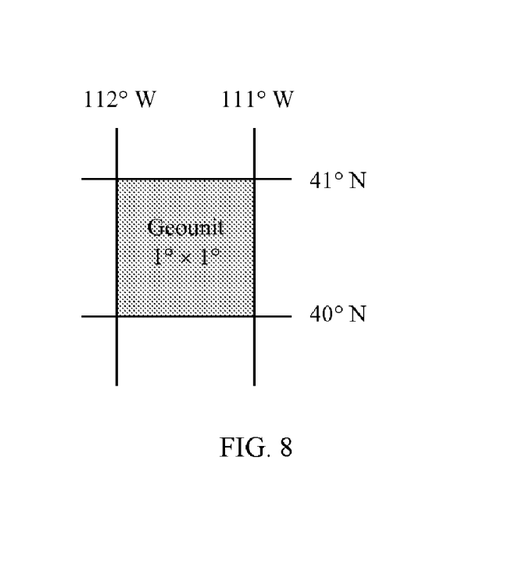
FIG. 8 illustrates an embodiment of a geounit.
Figure 9:
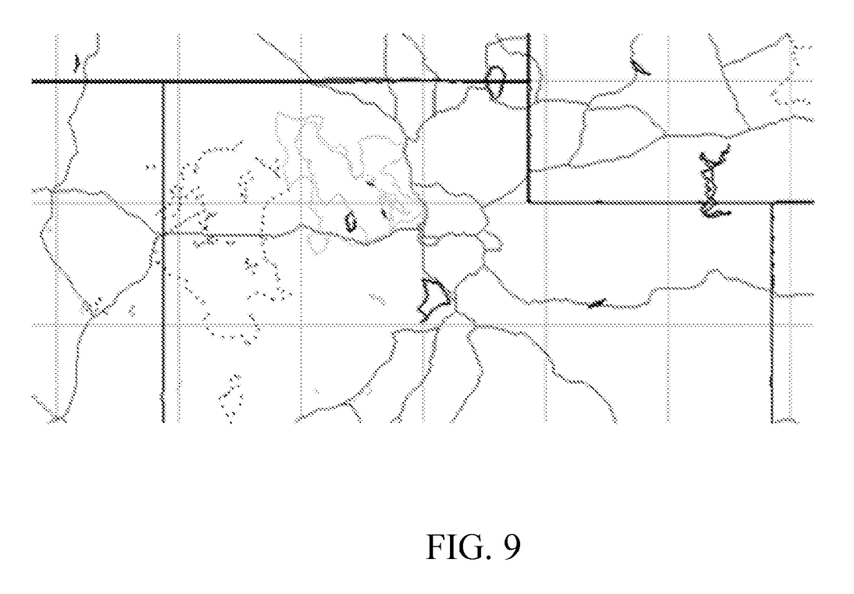
FIG. 9 depicts two or more geounits together which create a geographic area database.

If the system starts with a basic piece of a database being a 1° latitude by 1° longitude area called a geounit as shown in FIG. 8, then the system and database can collect geounits together to cover the geographic area of the database like the area database shown in FIG. 9. By piecing together geounits, the system can generate a database that covers the entire earth. FIG. 9 illustrates a database map constructed of geounits (marked by lighter rectilinear lines). Geounits are square in geodetic coordinates. Accordingly, the feature database can be a collection of square geounit pieces.

Inside of a geounit, the feature database can be subdivided hierarchically as has been done in the past. A one-to-four subdivision can be followed. The boundaries of the sub-geounit pieces can be one-half degrees, one-fourth degrees, one-eighth degrees, and so forth. Fortunately, these numbers can be exactly represented in the computer. Subdividing with a one-to-four pattern, through three or four levels, arrives with tiles that are between 10 and 20 kilometers on a side, which is a useful working size.

Each geounit can have an offset relative to the world coordinate system origin. This origin is at 0° latitude and 0° longitude. Terrain source material typically sets the southwest corner coordinates as the origin of a geounit. The present system and method can follow this convention and have the origin of all geounits over the whole earth with their global offsets at their southwest corner. By following this convention, the coordinates for all features within the geounit are positive in both latitude and longitude. For example, the geounit illustrated in FIG. 8 has an offset of (40.0, −112.0). Within the geounit, features can have coordinates relative to this southwest corner. A building may have geodetic coordinates of (40.69666667°, −111.80388889°) which can be an offset of (0.69666667°, 0.19611111°) relative to the southwest corner of this geounit.

The source data typically used to represent point, linear, and areal features are in vector form in geodetic coordinates. This means that for point features simply the geodetic coordinates are given. For linear features, a series of vectors are given that define the line for the feature. These vectors are in geodetic coordinates. For areal features, the boundary is represented as a list of vectors from one point on the boundary to the next point on the boundary in geodetic coordinates.

By using the point, linear, and areal data without projection or transformation, the system can retain the appropriate characteristics for this whole round-earth system and method.

Many of the algorithms typically used to process these features can also continue to be used. By using the geodetic coordinate values in a similar manner as the former projected Cartesian coordinate values, the data processing algorithms can remain largely unchanged.

One function that is modified in the present invention is the generation of polygons for linear features. The rules for generating these polygons use specified widths for the features to be generated. For example, a road can be defined as being 10 meters wide. Accordingly, the road is 10 meters regardless of the road's latitude. Consequently, the modeling tools can generate the road vertices in geodetic coordinates while taking into account desired final topocentric coordinates of the road. These calculations can be accomplished using equations given in the Mathematical Calculations section.

Another element of the image generation system data is themel data, which is modeled objects and texture data that are indicative of stored landscape characteristics, such as forest, cityscape, shoreline, etc. Themels can also be positioned in geodetic coordinates. The themel grid can be stored in geodetic coordinates in the same manner that the themel grid was stored in Cartesian coordinates in previous systems.

The themels can be incorporated into the global texture in geodetic coordinates because the global texture is in geodetic coordinates. The offset vector for the 3D portion of the themel set can be offset in geodetic coordinates, and the themel sets can line up with the terrain grid in geodetic coordinates.

Figure 10:
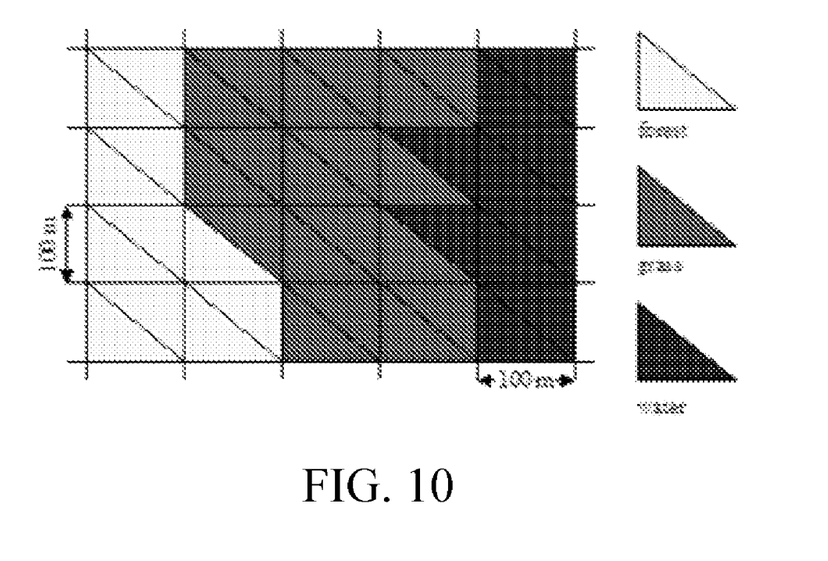
FIG. 10 illustrates a fixed size themel set that uses right isosceles triangles.

The design of the themel set (the 3D portion) does require some special consideration though. The basic outline of a themel set is a right isosceles triangle. In the previous Cartesian coordinate method, the triangle was a right isosceles triangle in Cartesian coordinates with the two edges joining at the right angle being some integer multiple or sub-multiple of the terrain facet size as shown in FIG. 10. In prior simulation systems, the themel sets were conformed to be congruent with the terrain facets so they could be added onto the terrain without further processing. With the layered architecture of the present invention, there is no such constraint. The use of square themels in geodetic coordinates is a more useful shape.

Figure 11:
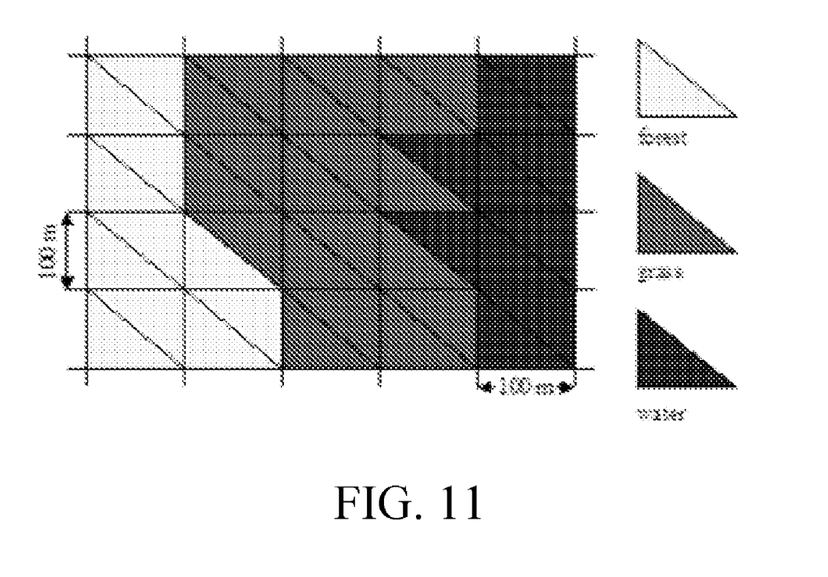
FIG. 11 illustrates a variable size themel set that uses right isosceles triangles.

In this round-earth method, the themel sets are right-isosceles triangles in geodetic coordinates as shown in FIG. 10. As each themel set is instantiated into position in the terrain grid the themel will align properly. However, since the actual size of the themel set triangle in meters is dependent on its latitude, it will vary throughout the database. This means that the themel set triangle shown in FIG. 10 is 100 meters on each edge at the equator and approximately 50 meters east-west by 100 meters north-south when at 60° latitude as in FIG. 11.

Because the geographic size of the themel set varies with latitude, the density and positioning of features within the themel set can also vary. The trees in a forest themel may be 10 meters apart at one latitude and only 5 meters apart at another latitude, but this does not create any significant problems for the present system.

Most databases cover only a small geographic area, as compared to the whole earth. Their latitude extent is usually quite modest. In these cases the themel sets can be designed for the mid-latitude of the database and the size of the themel set may vary only by a few percent. In a simulation, it does not generally matter if the trees are spaced every 9 meters, 10 meters, or 11 meters. This logic applies to residential and industrial type themel sets which do not appear to be significantly affected by modifying the themel size or spacing.

For databases that cover significant extents in latitude, multiple themel sets can be created for the various latitude regions to prevent excessive variations in the size of the themel set. It may also be appropriate to use different types of forest in the tropics as compared to the mid-latitudes, and the arctic regions. Since different themel sets may be created for different regions they can each be designed with the appropriate spacing of features within the themel set.

In the design of each themel set, the individual features within the themel set are offset in geodetic coordinates relative to the origin of the themel set. This means that trees, houses, buildings, rocks, etc. are all offset in relative geodetic coordinates. As the themel is processed in the image generator, these offsets are converted into topocentric coordinates appropriate for the current eyepoint.

Another embodiment of an image generator can use a database that separates the terrain from the features. The terrain skin can be generated in real time from elevation data stored in the terrain grid post database. The terrain grid post elevation data can be stored in geodetic coordinates and in a regular grid at a specified resolution. The terrain can also have the typical MIP structure (Multum In Parvo, meaning a multitude in a small space) to manage level-of-detail. Separating the terrain from the features can make the generation of the elevation database easier since the source data is actually provided in geodetic format. Keeping the terrain in geodetic coordinates avoids projecting the source data using a map projection and then re-sampling the data as done in the past. The terrain grid post data can be used in the form it is received and either MIP or bilinear blended to the appropriate resolution for the database design.

In the present invention, when the terrain processor works on the terrain, it will be working in geodetic coordinates. The terrain triangles generated can be right isosceles triangles in geodetic coordinates. Further, the features that are conformed or clipped to the terrain will be placed in geodetic coordinates, transformed to Cartesian coordinates, then clipped and conformed in Cartesian coordinates.) During the geometric processing, the geodetic coordinates of the vertices can then be transformed into topocentric coordinates. Thus, the converted triangles rendered in Cartesian coordinates will not be right isosceles triangles. Once all of the terrain processor work is completed, the actual shape of the triangles in topocentric coordinates does not generally matter to the rendering engine.

Global texture is an array of texels that covers the entire database. In the present database coordinate system, these texels are all square areas in geodetic coordinates. This is dramatically different than previous global texture databases. The absolute size of a texel in meters varies from texel to texel. The texels are all approximately the same size in the north-south direction but may vary by a factor of up to 6:1 in the east-west direction depending on the latitude.

Figure 12:
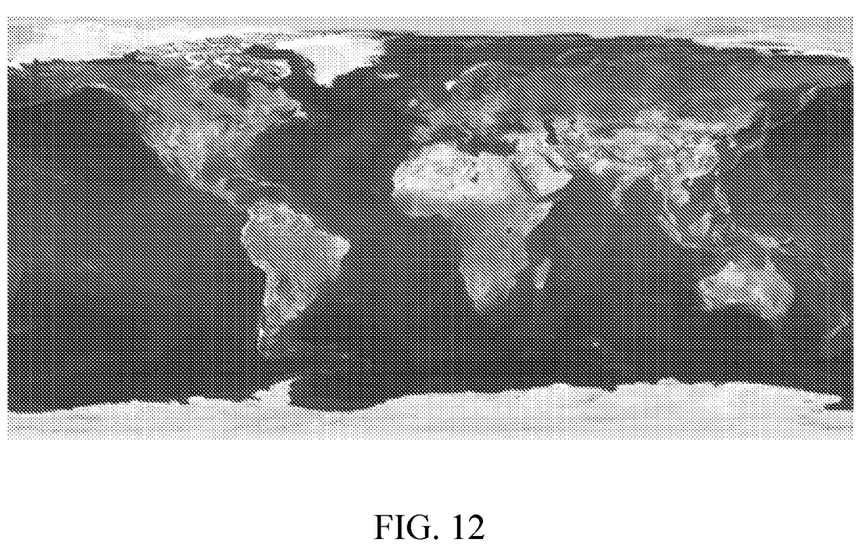
FIG. 12 illustrates one MIP layer of global texture.

FIG. 12 shows one MIP layer of the global texture. In this layer there are 512×256 texels. Therefore, each texel is 0.70312500°×0.70312500° (360÷512 and 180÷256). In actual meters, the texels vary from 78131.25 m×78131.25 m near the equator to 13567.35 m×78131.25 m near±80° latitude. By using the appropriate (u, v) coordinates for each vertex in the database that is using global texture, all of the scaling corrections are taken care of and the resulting textured polygons look good. Other MIP layers can also be provided but are not illustrated here.

One change used with the Cartesian feature models and dynamic models is a flag on the top node of the model that says this node and everything below this node is represented in Cartesian coordinates. When the graph walker encounters this flag, it can switch from geodetic mode to topocentric mode. This flag can be part of the model or set in the modeling tools when the model is added to the database graph.

The accuracy of the present image generator is also improved as compared to previous image generators. Accuracy deals with how well object positions in the simulated scene correlate to the real world. There are two fundamental issues involved here. The first is the accuracy of the positioning of the eyepoint, dynamic models, and static models. The second issue deals with range and bearing from the eyepoint to other points in the scene.

The positioning of the eyepoint, dynamic models, and static models in the database of the present invention is relatively exact, at least within the finite accuracy of double-precision computer arithmetic and the geodetic coordinate system being used (e.g., WGS84). This is because the positions of these things are in geodetic coordinates and the database is built in geodetic. coordinates.

The second issue deals with the relative position of objects in the rendered scene compared with what their relative position would be in the real world. Relative position means the range and azimuth from the eyepoint to the object. The desire is to provide objects rendered in the image generator scene have exactly the same relative position as in the real world.

One embodiment of the invention can generate the relative position of an object within 1° at 20 nmi and 1 mrad (0.06°) at 10 nmi. At this level of accuracy provided by the present invention, there is little noticeable difference between the image generator rendered scene and what the users or pilots expect to see in the real world.

The 1° criteria at 20 nmi means that when the mission computer on a simulated aircraft points to a target by displaying a cursor in the heads-up display or on the weapons monitor for a target that is 20 nmi away, the cursor will be almost perfectly centered. 20 nmi is about as far away as a target would be looked for and one degree is relatively close. By comparison, the graduation marks on orienteering compasses are 2° apart. At 10 nmi targets are often locked on to and the weapons are fired. The 1 mrad criterion is based on the fact that the widths of the lines that make up the cursor are about 1 mrad. In cases where these errors are too large, the Host coordinates steering the sensor can be modified to nullify distortions caused by the system.

This system and method has tested points at various azimuths around the eyepoint and at various ranges. For measured errors between the rendered scene and the real world, it was found that for eyepoints as high in latitude as±60° the error criteria were met. By the time the eyepoint is at 80° in latitude, the error at 20 nmi is still less than 1° and only about 4 or 5 mrad at 10 nmi. The errors get larger as the eyepoint nears the pole, but as long as the database does not actually touch the pole then the present model generally works.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

MATHEMATICAL CALCULATIONS

A.1 Geodetic to Topocentric Coordinates Transformation

The full transformation from geodetic to topocentric coordinates can often be too processor intensive to be used in some real-time processing. A simplified transformation method has been developed that uses the following equations:

$$R' = a(1-e^2)/(1-e^2 \sin^2\phi_0)^{3/2} \quad (1)$$

$$N = a/(1-e^2 \sin^2\phi_0)^{1/2} \quad (2)$$

$$k_1 = N \cos\phi_0 \quad (3)$$

$$x = k_1(\lambda-\lambda_0) \quad (4)$$

$$y = R'(\phi-\phi_0) \quad (5)$$

$$z = h \quad (6)$$

where,
R'=the earth's radius of curvature in the plane of the meridian (meters)
N=the earth's radius of curvature in a plane perpendicular to the meridian and also perpendicular to the plane tangent to the surface (meters)
a=the semi-major axis of the ellipsoid, i.e. the equatorial radius (meters)
e=the eccentricity of the ellipsoid (no units)
$\phi$=the latitude of a point (radians)
$\phi_0$=the latitude of the eyepoint (radians)
$\lambda$=the longitude of a point (radians)
$\lambda_0$=the longitude of the eyepoint (radians)
h=the altitude of a point above the geoid (meters)
$k_1$=an intermediate factor
(x, y, z)=the topocentric (Cartesian) coordinates of a point (meters)

The values for R', N, and $k_1$ can be computed once each frame based on the current eyepoint. The values for (x, y, z) are computed for each geodetic coordinate transformed into topocentric coordinates. The heading, pitch, and roll of the eyepoint and the dynamic models do not require any transformation.

On some older image generators and simulators, they have assumed a spherical earth for simplicity. Usually older image generators have used a radius of 6,366,707.02 m so that one arc minute comes out to be one nautical mile. If it becomes necessary to interface to one of these older systems, the present system and method can still use equations 1 through 7 and set the value of a=6366707.02 and e=0.0 instead of the WGS84 values.

A.2 Topocentric to Geodetic Coordinates Transformation

There may be cases where the (x, y, z) coordinates of a point are known during rendering and the geodetic coordinates are desired. In this case, the transformation from topocentric coordinates to geodetic coordinates can use the following simplified equations:

$$\phi = \phi_0 + y/R' \quad (7)$$

$$\lambda = \lambda_0 + x/k_1 \quad (8)$$

$$h = z \quad (9)$$

with the same variable definitions as given in the geodetic to topocentric transformation equations.

A.3 Range Test in Geodetic Coordinates

As the graph walker is traversing the upper portions of the database tree, it will need to perform range tests for level-of-detail decisions. Since the center of the node will be in geodetic coordinates, the range computation will be slightly modified.

Given the eyepoint centered geodetic coordinates of a node, i.e. the relative latitude, longitude, and height from the eyepoint, as (Δϕ, Δλ, h) then the range, r, to the node is:

$$r=\sqrt{(k_1\Delta\lambda)^2+(R'\Delta\phi)^2+z^2} \quad (10)$$

where, $k_1$ and R' are as defined in section A. 1.

A.4 Field-of-View Test in Geodetic Coordinates

As the graph walker is traversing the upper portions of the database tree it will need to perform field-of-view tests for culling decisions. Since the center of the node will be in geodetic coordinates, the computation is slightly modified.

The standard plane equation is:

$$Ax+By+Cz+D=0 \quad (11)$$

Since the clipping planes always go through the eyepoint, the value of D is always 0. So, the clipping plane is typically represented by its normal vector of (A, B, C).

The eye-to-node vector is represented by $[k_1\Delta\lambda, R'\Delta\phi, h]$. Then the dot product between these two vectors is:

$$d=A\cdot k_1\Delta+B\cdot R'\Delta\phi+Ch \quad (12)$$

where, $k_1$ and R' are as defined in section A.1 and d is the distance from the node center to the clipping plane. If d is positive, the node is outside of the clipping plane. If d is negative, the node is inside.

What is claimed is:

1. A method for modeling a world database that is a spheroid in a computer graphics simulation system, comprising the steps of:
    modeling the world database using a plurality of geodetic terrain gridposts;
    creating a triangulated network mesh based on the geodetic terrain gridposts in real-time as a function of eye position and the triangulated network mesh is stored in geodetic coordinates;
    converting the triangulated network mesh from geodetic coordinates to Cartesian coordinates including multiplying a longitude portion of the geodetic coordinates by a latitude-dependent scale factor to obtain a Cartesian coordinate;
    rendering the triangulated network mesh using geometry formed by the triangulated network mesh to form an image displayable to a user; and
    reducing a terrain facet size of the triangulated network mesh as the latitude increases.

2. The method as in claim 1, further comprising the step of displaying the rendered triangulated network to a user.

3. A system for modeling a world database that is a spheroid in a computer graphics simulation system, comprising:
    a world database modeled with geodetic terrain gridposts;
    means for creating a triangulated network mesh from the geodetic terrain gridposts;
    means for converting the triangulated network mesh to eye-relative localized geodetic coordinates in real-time;
    means for converting the eye-relative localized geodetic coordinates to Cartesian coordinates by multiplying a longitude portion of the eye-relative localized geodetic coordinates by a latitude-dependent scale factor to obtain a Cartesian coordinate; and
    a terrain facet with reduced size for the triangulated network mesh as the latitude increases.

4. A method for modeling a world database that is spheroid in a computer graphics simulation system, comprising the steps of:
    modeling the world database using geodetic terrain gridposts;
    creating a triangulated network mesh from the geodetic terrain gridposts;
    converting the triangulated network mesh to localized eye-relative geodetic coordinates in real-time;
    converting the localized relative geodetic triangulated network mesh to Cartesian coordinates in real-time, wherein the conversion is performed by multiplying a longitude portion of the geodetic coordinates by a latitude-dependent scale factor to obtain a Cartesian coordinate;
    rendering the triangulated network mesh using the geometry formed by the triangulated network mesh to form an image displayable to a user; and
    reducing a terrain facet size in the triangulated network mesh as the latitude increases.

5. A system for modeling a world database that is a spheroid in a computer graphics simulation system, comprising:
    a world database modeled with geodetic terrain gridposts on a seamless, continuous fiat datum;
    means for creating a triangulated network mesh from the geodetic terrain gridposts;
    means for converting the triangulated network mesh to eye-relative localized geodetic coordinates in real-time;
    means for converting the eye-relative localized geodetic coordinates to Cartesian coordinates by multiplying a longitude portion of the eye-relative localized geodetic coordinate by a latitude-dependent scale factor to obtain a Cartesian coordinate; and
    a terrain facet with reduced size for the triangulated network mesh as the latitude increases.

6. A system as in claim 4, wherein polar caps are approximately 500 to 1500 miles in diameter.

7. A method for modeling a world database that is a spheroid in a computer graphics simulation system, comprising the steps of:
    modeling the world database using a plurality of geodetic terrain gridposts;
    creating a triangulated network mesh based on the geodetic terrain gridposts;
    storing the triangulated network in geodetic coordinates;
    storing the feature models in Cartesian coordinates;
    attaching the feature models to the triangulated network for the world database at geodetic coordinates;
    rendering the triangulated network and the attached feature models on top of geometry formed by the triangulated network wherein the triangulated network is converted from eye-relative geodetic coordinates to Cartesian coordinates by multiplying a longitude portion of the eye-relative geodetic coordinate by a latitude-dependent scale factor to the eye-relative geodetic coordinates to form an image displayable to a user; and
    reducing a terrain facet size of the triangulated network as the latitude increases.

* * * * *